United States Patent
Faltz et al.

(10) Patent No.: US 11,243,984 B2
(45) Date of Patent: Feb. 8, 2022

(54) PROVIDING CHANGING DATA-SOURCE STATES TO FRONT ENDS VIEWING A SCENE IN A DATA ORCHESTRATION SYSTEM

(71) Applicant: SAP SE, Walldorf (DE)

(72) Inventors: Alexandre Faltz, Porto Alegre (BR); Eduardo Berlitz, Porto Alegre (BR); Eduardo Carvalho, Rio de Janeiro (BR); Joachim Fitzer, Frankfurt (DE); Reinhold Kautzleben, Karlsruhe (DE); Willian Mendes, São Paulo (BR)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 16/208,771

(22) Filed: Dec. 4, 2018

(65) Prior Publication Data
US 2020/0175040 A1    Jun. 4, 2020

(51) Int. Cl.
*G06F 16/00*    (2019.01)
*G06F 16/28*    (2019.01)
*G06F 16/9538*  (2019.01)

(52) U.S. Cl.
CPC ........ *G06F 16/285* (2019.01); *G06F 16/9538* (2019.01)

(58) Field of Classification Search
CPC combination set(s) only.
See application file for complete search history.

(56) References Cited

U.S. PATENT DOCUMENTS

| | | | | |
|---|---|---|---|---|
| 6,826,594 B1* | 11/2004 | Pettersen | ................ | H04L 29/06 709/203 |
| 7,565,280 B2* | 7/2009 | Moriat | .................. | G06F 30/331 703/22 |
| 8,577,911 B1* | 11/2013 | Stepinski | ............ | G06F 16/3328 707/765 |
| 9,886,377 B2* | 2/2018 | Werner | ................ | G06F 12/023 |
| 10,089,635 B1* | 10/2018 | Broxton | ................ | G06Q 30/02 |
| 10,552,129 B2* | 2/2020 | Salgado | .................. | G06F 9/544 |
| 10,599,669 B2* | 3/2020 | Sexton | ..................... | G06F 17/18 |
| 2010/0115206 A1* | 5/2010 | de la Iglesia | ....... | G06F 12/0862 711/137 |
| 2012/0041990 A1* | 2/2012 | Kreindlina | ............ | G06F 16/248 707/805 |
| 2013/0144916 A1* | 6/2013 | Lum | ....................... | G06F 16/00 707/790 |
| 2016/0246863 A1* | 8/2016 | Sexton | ................. | G06K 9/6218 |

(Continued)

*Primary Examiner* — Farhan M Syed
(74) *Attorney, Agent, or Firm* — Sterne, Kessler, Goldstein & Fox P.L.L.C.

(57) ABSTRACT

Disclosed herein are system, method, and computer program product embodiments for providing access to changed states in a data source to front-ends and back-ends in a data orchestration system. When displaying a scene including transformed data, a data orchestration system may receive a change to the data source from the data repository or a client viewing the data. The data orchestration system may transform data based on configured data pipelines and propagate the changed state to all viewing clients and to the backend data repository. By managing the connections, pipelines, operators, data sources, clients, backends, and other components, the data orchestration system may provide intelligent data solutions and advanced analytic capabilities across the entirety of an organization's data landscape.

20 Claims, 6 Drawing Sheets

(56) References Cited

U.S. PATENT DOCUMENTS

| | | | |
|---|---|---|---|
| 2017/0097884 A1* | 4/2017 | Werner | G06F 12/023 |
| 2018/0089262 A1* | 3/2018 | Bhattacharjee | G06F 16/24532 |
| 2018/0150495 A1* | 5/2018 | Hoff | G06F 16/2282 |
| 2019/0057163 A1* | 2/2019 | Thomas | G06F 16/248 |
| 2019/0179621 A1* | 6/2019 | Salgado | G06F 9/544 |

* cited by examiner

PROVIDING CHANGING DATA-SOURCE STATES TO FRONT ENDS VIEWING A SCENE IN A DATA ORCHESTRATION SYSTEM

BACKGROUND

In some cases, organizations integrate vast amounts of data from across distributed data landscapes by employing a data orchestration system. Through a data orchestration system, an organization may integrate, manage, and organize a data landscape while extracting maximum value from the data towards programmatic, analytical, or diagnostic goals. Data orchestration systems have been developed and deployed across a multitude of industries, including the financial and banking sectors, transportation services, entertainment industries, insurance, healthcare, education, medicine, retail, and more. Handling such immense amounts of varied and substantial data presents unique technical problems requiring distinct solutions because traditional data processing applications may not be able to fully leverage and extract meaning from the gargantuan and dispersed datasets captured by modern organizations, given their sheer scale. Moreover, a data orchestration system requires specialized approaches to ingest and transform the data and to facilitate collaboration between members of the organization and other users.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing changed data-source states to front-ends viewing a scene in a data orchestration system.

A data orchestration system may govern, gather, refine, and enrich any type, variety and volume of data across an organization's distributed data landscape. A data orchestration system may cull data from various sources inside and outside of an organization. Such sources may include data lakes, data silos, message streams, relational databases, semi-structured data (CSV, logs, xml, etc.), unstructured data, binary data (images, audio, video, etc.), or other suitable stored data, both on-premises and on the cloud. A data orchestration system may allow administrators to organize and manipulate the data and to design and deploy user interfaces or scenes in which users or customers may interact with the data, view derived analytics, and investigate real-world happenstances.

A data orchestration system may incorporate data processing pipelines to refine, analyze, and modify data in an organization's distributed data landscape. A data processing pipeline may be a set of data-transforming operators connected in series or run in parallel. An exemplary data processing pipeline may convert data from one format to another, present visualizations, share data across applications, analyze video files using artificial intelligence, and perform many other functions, the breadth and extent of which will be understood by persons skilled in the relevant art(s). In an embodiment, the datasets processed by data processing pipelines are large, having thousands, millions, billions, or trillions (or more) records.

Operators in a data processing pipeline may be predefined or custom-built and may act upon data sources in a myriad of fashions. Data processing pipelines including more than one operation may specify connections between the operators. Thus, an operation may receive a data input, transform, modify, or otherwise operate upon the inputted data, and then pass the transformed data as output to a subsequent operation, component, scene, user, etc. An operation may have zero or more inputs and zero or more outputs. Operators may run in parallel or in serial. An administrator may design custom operators or leverage standardized operators to build data pipelines in the data orchestration system.

A data orchestration system may present manipulated or raw data, derived analytics, and other helpful information to users in a scene, i.e., a user interface designed to organize and display the results of data pipelines. A scene may pull and organize data from various back-end sources, data repositories, and other components within the data orchestration system. A scene may include various mechanisms that allow users to interact with the data, e.g. sliders, filters, sorting devices, and other suitable input mechanisms. Multiple users may view and interact with a scene at any given time. A data source in a scene may be thought of as having a state, i.e., the current nature and characteristics of the data. When the state changes, either from a modification to the source data repository or repositories, manipulation via an operation in a transformative data pipeline, or a change on the front-end from one of the clients, the updated state may be propagated to front-end users and/or to the data repository to provide a shared viewing experience.

Accordingly, embodiments of this disclosure allow a data orchestration system to provide changed data-source states to front-ends and data repositories in the data orchestration system.

Figure 1:
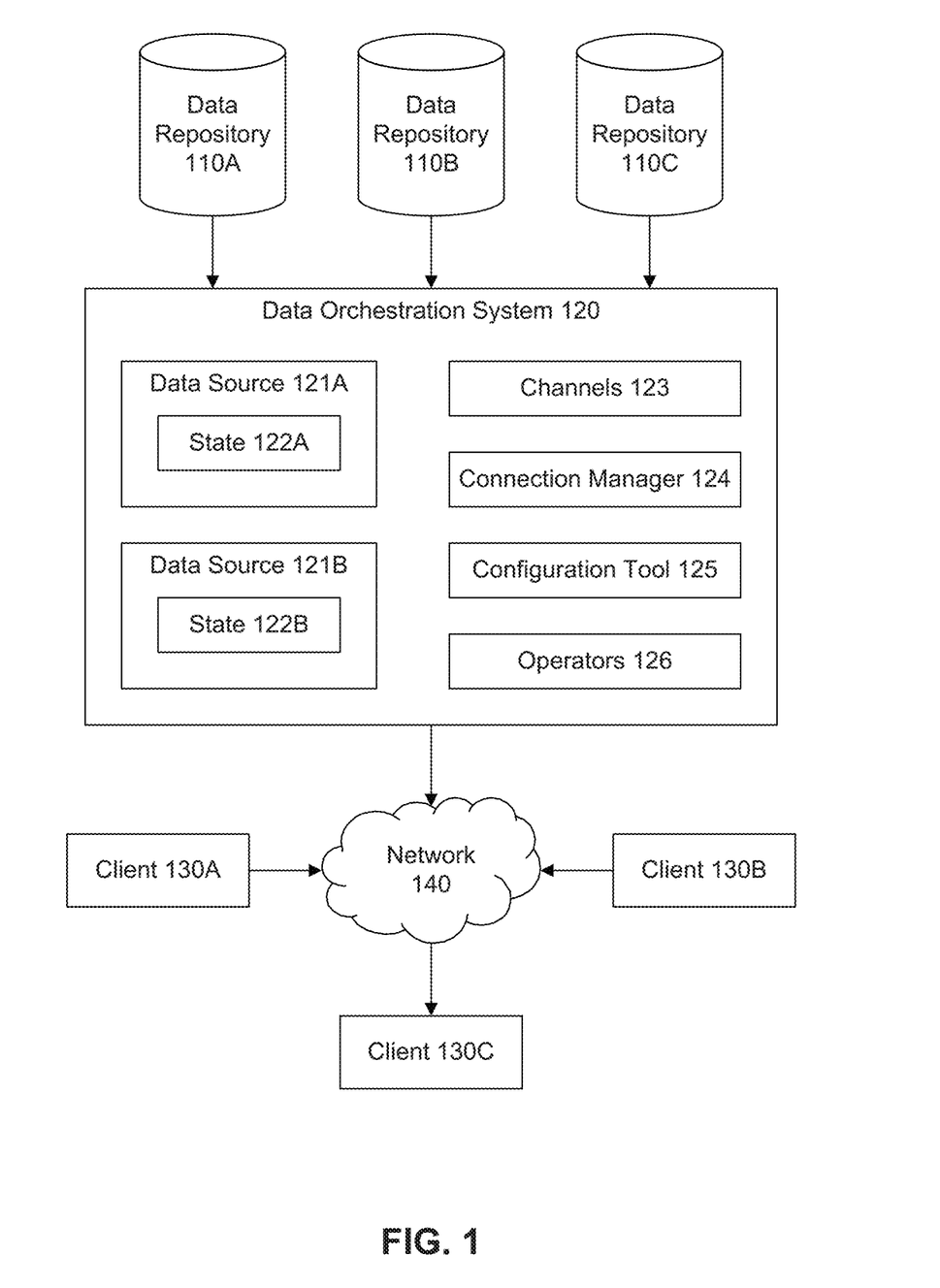
FIG. 1 is a block diagram of an environment including a data orchestration system, according to some embodiments.

FIG. 1 is a block diagram illustrating environment 100 having a data orchestration system 120, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Environment 100 includes data repository 110, data orchestration system 120, client 130, and network 140.

Data repository 110 may be any of a panoply of data storage systems housing information relevant to an organization. Data repository 110 may be a database management system or relational database tool. Data repository 110 may further be a message queue or stream processing platform such as Apache Kafka or Apache Spark or other data storage systems like Apache Hadoop, HDFS, or Amazon S3, to name just some examples. Data repository 110 may be a data lake, data silo, semi-structured data system (CSV, logs, xml, etc.), unstructured data system, binary data repository, or other suitable repository. Data repository 110 may store thousands, millions, billions, or trillions (or more) of objects, rows, transactions, records, files, logs, etc. while allowing for the creation, modification, retrieval, archival, and management of this data. In an embodiment, data repository 110 uses scalable, distributed computing to efficiently catalog, sort, manipulate, and access stored data.

Data orchestration system 120 includes data source 121, state 122, channels 123, connection manager 124, configuration tool 125, and operators 126. Data orchestration system 120 transforms, converts, modifies, manages, transfers, adds to, subtracts from, analyzes or otherwise interacts with data from data repository 110 and passes results and derivations to users in an appropriate user interface. Exemplary operators 126 conducted within data orchestration system 120 may include: converting data from one format to another, preparing data for visualization, organizing the data, mining the data using regular expressions, natural language processors, or other mechanism, sharing data between different web applications, editing video/audio files, or any of a myriad of suitable interactions. In an embodiment, data orchestration system 120 executes operators 126 in real-time using parallel and distributed processing, channels, pipelines, and other big-data manipulation techniques.

Data orchestration system 120 may incorporate data processing pipelines and other transformational approaches to provide advance analytics and intelligent data based on the contents of data repository 110. Data orchestration system 120 may run various predefined or custom-built functions, i.e., operators 126, against the data to transform, organize, and analyze the data and/or perform additional programmatic functions with the data. Data orchestration system 120 may present the manipulated (or raw) data, derived analytics, visualizations, and other results to users in a user interface, i.e., a scene. A scene may pull and organize data from various back-end sources and frame the derived information for one or more users, i.e., front-ends or clients, at any given time.

Data source 121 may be configured in data orchestration system 120. Data source 121 may be derived from a suitable data repository 110, either in a raw form or following (or at an intermediate step within) the application of a data pipeline. Such sources may include data lakes, data silos, message streams, relational databases, semi-structured data (CSV, logs, xml, etc.), unstructured data, binary data (images, audio, video, etc.), or other suitable data types in appropriate repositories, both on-premises and on the cloud. Data orchestration system 120 may allow data administrators to organize and manipulate the data and to design and provision suitable user interfaces, i.e. scenes, in which users or customers may view formatted data and derived analytics determined based on data source 121. Data source 121 may incorporate data from multiple data repositories.

State 122 may reflect the current circumstances, in light of changes to data repository 110 and changes from clients, of data source 121 in data orchestration system 120. In an embodiment, state 122 may be represented by an appropriately formatted tuple, e.g., using JSON, XML, or other human readable transfer protocol. When state 122 changes, either based on a change to data repository 110 or the reception of an input from a input, data orchestration system 120 may propagate the changed data to other users viewing the system. In an embodiment, data orchestration system 120 transmits only a delta, i.e., the differences between a current state as compared to a previous state, of changed data in the state to the other front-ends to improve the efficiency of the transaction.

Channels 123 may be pipelines or connections between a backend, data source 121, and other components in data orchestration system 120. Channels 123 may transmit data using any suitable transfer protocol, communication protocol, or other mechanism. Channels 123 may provide connections between operators 126, data source 121, data repository 110, and other components in data orchestration system 120. In an embodiment, channels 123 may specify a directional connection, i.e., either an inflow or outflow. However, channels 123 may also be bi-directional, i.e., used to both send and receive information.

Connection manager 124 may manage connections between and among various clients, back-ends, and data orchestration system 120. Connection manager 124 may employ stateless communication pipelines and/or channels 123 to relay changes to data repository 110 to data source 121. In an embodiment, connection manager 124 may employ websocket connections or other suitable communication protocol. Connection manager 124 may track connections between data orchestration system 120 and clients, such as client 130. For example, if a new client, such as client 130, connects to data orchestration system 120 to view a scene, connection manager 124 may add the new client to list of clients currently viewing the scene. Connection manager 124 may store stateful information, information about the scenes being viewed by client 130, security and cryptographic details, and any other suitable information related to the connections to, from, and within data orchestration system 120.

Configuration tool 125 may allow a superuser, administrator, power user, etc. to configure data pipelines within data orchestration system 120, as well as operators, data sources, and other components. Configuration tool 125 may present a suitable user interface to an administrator to facilitate the creation of data pipelines and scenes, as described below with reference to FIGS. Configuration tool 125 may provide a preview mode, where by an administrator may view a scene or interface from the perspective of client 130. Configuration tool 125 may include various software lifecycle management resources, for example, a revision control system. Configuration tool 125 may allow an organization to create, modify, and edit data processing pipelines, data source 121, channels, scenes, etc. in data orchestration system 120. In an embodiment, configuration tool 125 provides a visualization tool whereby a data administrator may visualize the data processing pipeline in graphical form. Configuration tool 125 may display operators 126, any connections between operators 126, programming languages of each operation among operators 126, and other appropriate details. Configuration tool 125 may provide a configuration panel through which an administrator may adjust the properties of data source 121, operators 126, scenes, and other components.

Operators 126 may represent reactive components in data orchestration system 120 that respond to events within data orchestration system 120 or events occurring internally within operators 126. Operators 126 may interact with data orchestration system 120 through one or more inputs and provide output to data orchestration system 120 and other components therein via one or more output ports. Operators 126 may manipulate, edit, or otherwise transform inputted or generated data. Data orchestration system 120 may provide standardized and predefined operators 126 for use by an administrator. In an embodiment, data orchestration system 120 may allow users to build customized operators 126.

Client 130 may be a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Client 130 may be a member of a business, organization, or other suitable group using data orchestration system 120 to intelligently manage their data landscape. A user of client 130 may be an individual, entity, user, customer, etc. using data-driven software applications. A user of client 130 may be a human being, but the user may also be an artificial intelligence construct. Although client 130 is illustrated in the example of FIG. 1 as a single computer, one skilled in the art(s) will understand that device 104 may represent two or more computers in communication with one another.

Network 140 may be any network or combination of networks including the Internet, a local area network (LAN), a wide area network (WAN), a wireless network, a cellular network, or various other types of networks as would be appreciated by a person of ordinary skill in the art. Client 130 may connect to data orchestration system 120 via network 140.

Figure 2A:
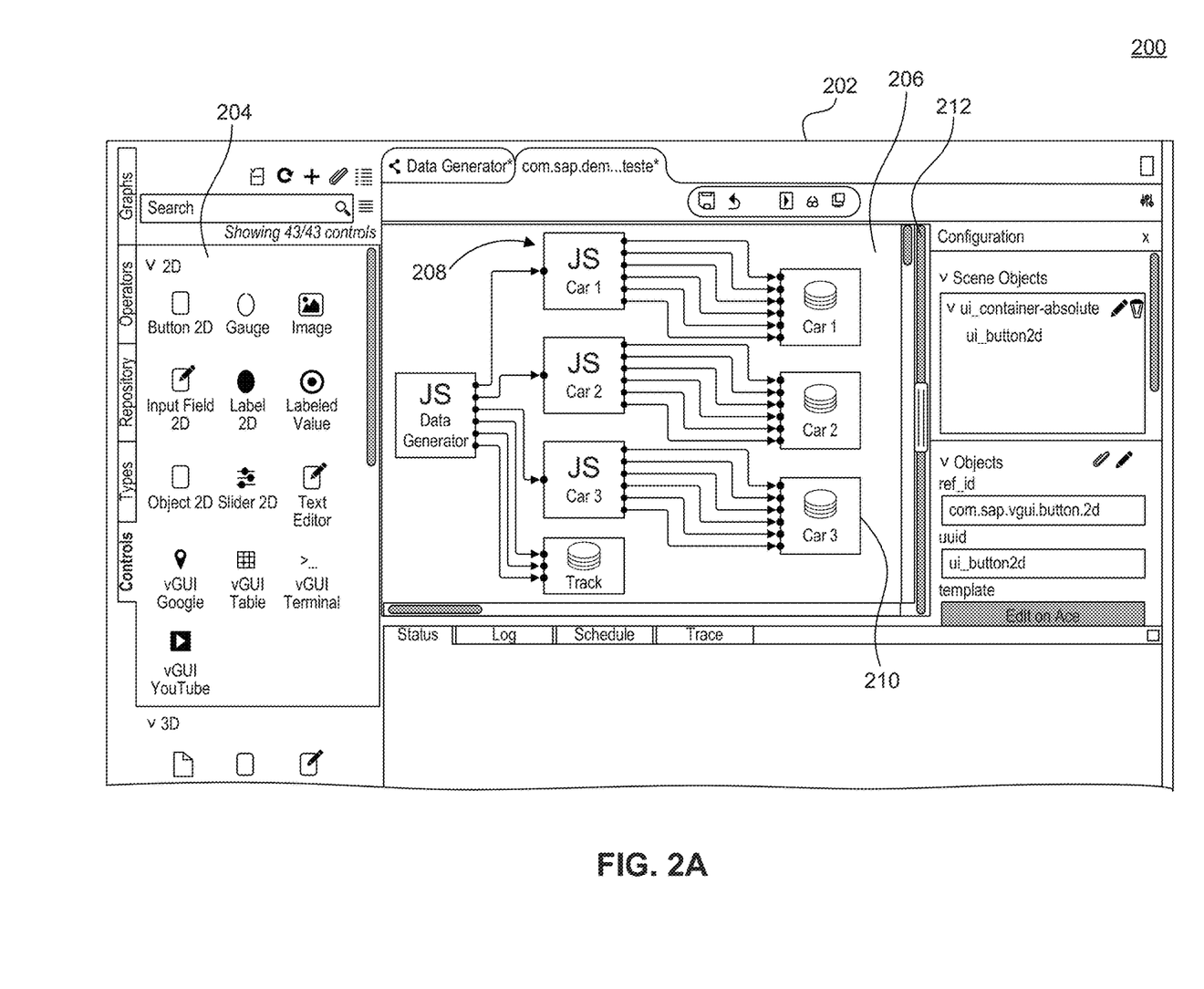
FIGS. 2A-2B are example screen displays of an data orchestration system, according to some embodiments.
Figure 2B:
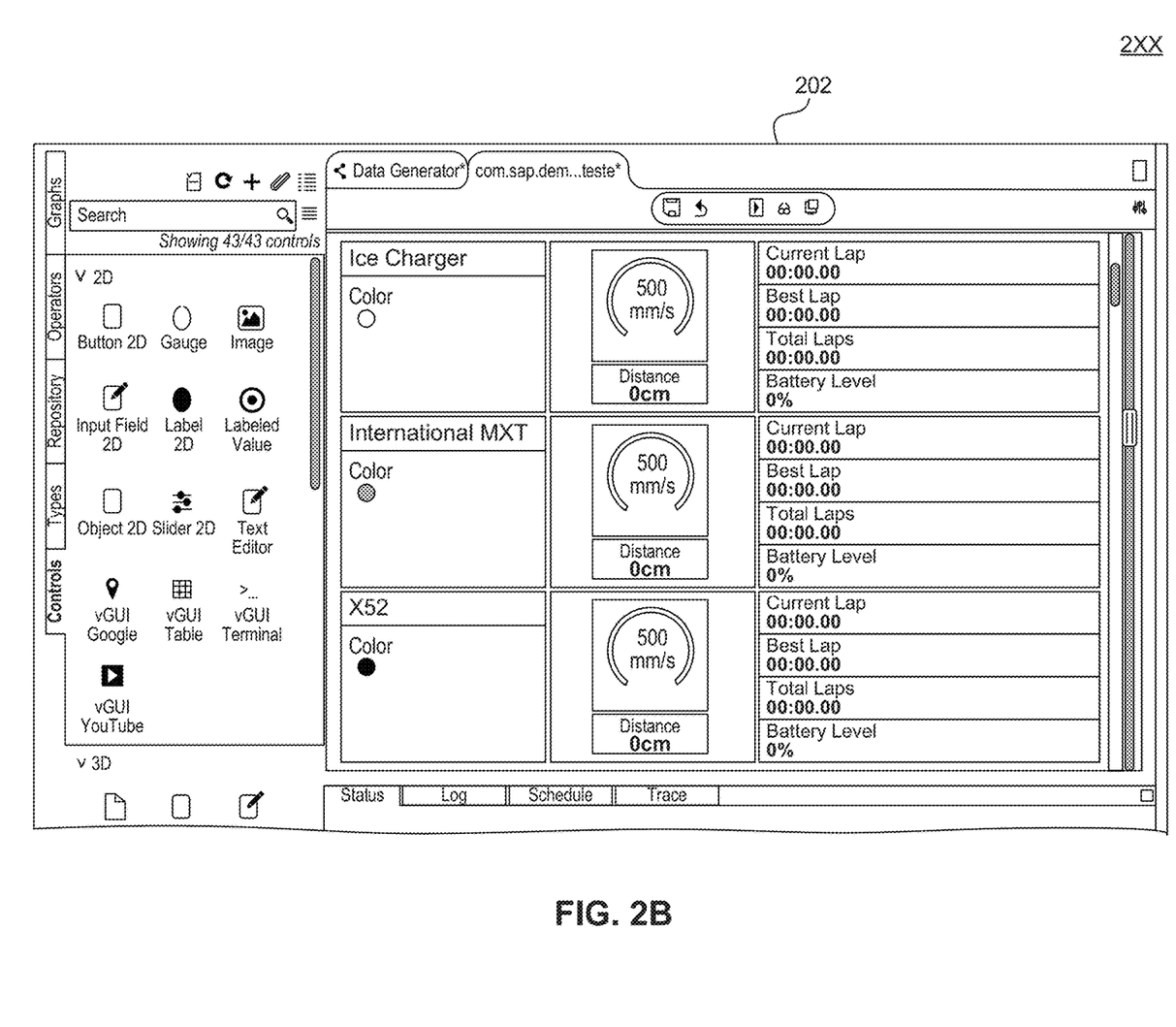

FIGS. 2A-2B are examples of screen display 200 of an exemplary data orchestration system, according to some embodiments. The screen displays provided in FIGS. 2A-2B are merely exemplary, and one skilled in the relevant art(s) will appreciate that many approaches may be taken to provide a suitable screen display 200 in accordance with this disclosure.

Data hub 202 provides an interface through which an administrator may configure pipelines, data source 121, scenes, and other components in data orchestration system 120. In an embodiment, data hub 202 includes a map view and a code-based view. Data hub 202 may further employ a drag-and-drop style design paradigm. Data hub 202 may include objects 204, panel 206, pipeline 208, scene 210, and configuration details 212.

Objects 204 may include various data repositories, such as data repository 110, connections, operators 126, data source 121, such as data source 121, and other tools and components used to build pipelines in data orchestration system 120. In an embodiment, objects 204 may be dragged and dropped to allow for the easy creation of a data pipeline by an administrator.

Panel 206 may include a current data pipeline, data source 121, operators 126, created scenes, etc. Panel 206 may include various input mechanisms. Panel 206 may provide a diagram-based view or panel 206 may provide a code-based view.

Pipeline 208 may be the current pipeline being developed by an administrator in panel 206. Pipeline 208 may include various data sources, operators 126, and transformative components.

Scene 210 may be a current scene, i.e., an interface through which client 130 may view data source 121. In an embodiment, by clicking or otherwise selecting scene 210, an administrator may be routed to a preview mode of a scene, where the administrator views the scene from the perspective of client 130.

Configuration details 212 may be details about scene 210. Such details include the object name, the user ID, a template for the object, the type of the object, the height and width of the object, etc. The nature of configuration details 212 may vary based on the type of object selected.

In the example provided in FIG. 2A, data hub 202 displays an exemplary pipeline 208 in panel 206. Objects 204 includes a variety of possible data sources, such as data source 121, objects, and operators 126 that a user may select or drag and drop when designing a data pipeline. Panel 206 may allow an administrator to modify the data sources, operators 126, and to view the connections between the various objects. Configuration details 212 includes information about a selected object, data source, or operation. The example provided in FIG. 2A is merely exemplary, however, and many suitable interfaces could be provided to accomplish similar functionalities.

In the example provided in FIG. 2B, an exemplary scene, such as scene 210 is displayed that depicts an exemplary data pipeline. In this example, pipeline 208 from FIG. 2A is relayed for a user in a lucid and clear fashion. This example is merely exemplary, however, and many suitable interfaces could be provided to accomplish similar functionalities.

Figure 3:
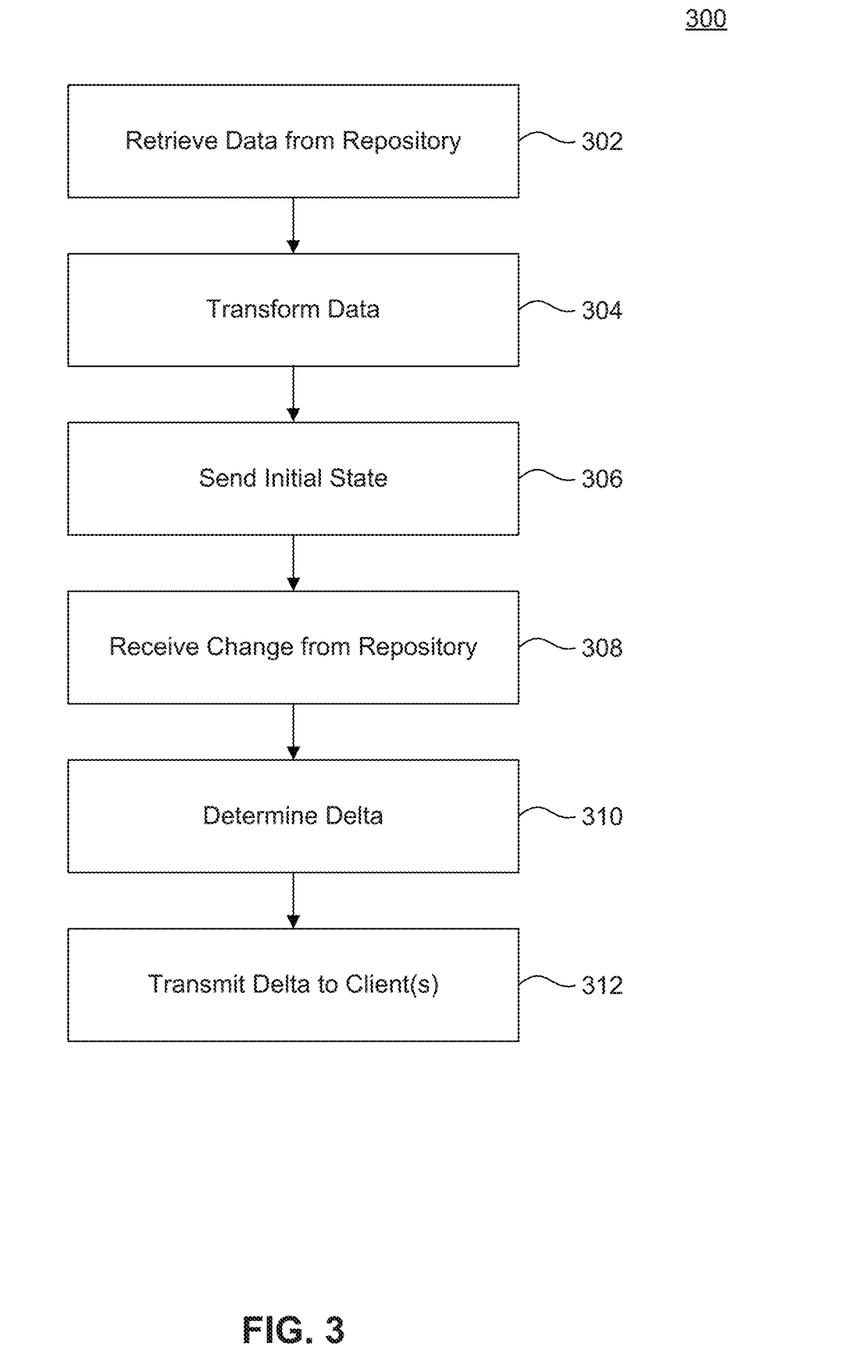
FIG. 3 is a flowchart illustrating a method of receiving a change to a displayed scene from a backend repository and propagating the change to one or more clients, according to some embodiments.

FIG. 3 illustrates a method 300 of a method of receiving a change to a displayed scene from a backend repository and propagating the change to multiple clients, according to some embodiments. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, data orchestration system 120 may retrieve information from data repository 110. In an alternate embodiment, data orchestration system 120 may retrieve data from an internal storage mechanism. Data orchestration system 120 may retrieve the information using an appropriate simple, stateless communication pipeline, e.g. a channel (e.g. channels 123), an open database connectivity interface, or other suitable retrieval technique. In one embodiment, data orchestration system 120 may formulate an appropriate structured-querying-language query or other formal- or natural-language construct to pull the relevant subset of data based upon permissions or other factors. Data orchestration system 120 may store the data or a portion of the data in memory, a local hard disk, a data structure, or any other suitable storage mechanism facilitating manipulation and transformation during subsequent steps. In some embodiments, data orchestration system 120 may retrieve the data through a suitable driver, application programming interface, querying mechanism, and/or other suitable protocol, for example, OData.

In 304, data orchestration system 120 may modify data retrieved in 302 in a myriad of programmatic and transformative fashions. Data orchestration system 120 may employ channels 123 to pass the data between and among operators 126, data sources (e.g. data source 121), scenes (e.g., scene 210), and other components. Data orchestration system 120 may store transformed data as data source 121 or as intermediary or transitional data state. For example, data orchestration system 120 may convert data from one format to another, present a visualization of the data, perform calculations and analytics based on the data, analyze video files using artificial intelligence, and perform many other functions. Data orchestration system 120 may transform data according to requirements specified by a scene, such as described above as scene 210. In one simple example, scene 210 may require numerical data to be displayed in floating point form, and data orchestration system 120 may pull the raw, numerical data and apply an appropriate converter to convert the data into floating point form.

In 306, data orchestration system 120 may send an initial state to client 130. One or more clients, such as client 130, may receive an initial state based on the information stored in data orchestration system 120. The number of connections between data orchestration system 120 and clients may vary based on the time and circumstances. Connection manager 124 may determine and track the connecting front-ends, i.e., client 130, that are to receive the initial state. Data orchestration system 120 may determine the initial state based on the transformational steps in 304. In an embodiment, the initial state may be stored, written, and/or relayed in JSON, XML, or other appropriate human and/or machine readable transfer protocol. In an alternate embodiment, the initial state may be reflected by any suitable Javascript variable and any suitable type, for example, Booleans, numbers, strings, arrays, structures, and advanced object types such as images, audio files, and videos. Connection manager 124 may send the initial state to other connected clients, such as client 130, as stored and managed by connection manager 124. In an embodiment, the initial state may be transfer to client 130 using an open websocket connection. Data orchestration system 120 may transfer the initial state to data repository 110 via channels 123 or other stateless or restful protocol.

In 308, data orchestration system 120 may receive a change from data repository 110 via channels 123. For example, if data repository 110 is a database server, an front-end application that writes to the database server may make a change to the database, for example, the addition of a row into a table. For another example, if data repository 110 is a data lake, a batch of transactions may be added to the data lake based on recent system usage. When the change occurs, data repository 110 may communicate the change via a pipeline, channels 123, or other suitable connection protocol to data orchestration system 120 and/or connection manager 124.

In 310, data orchestration system 120 may determine a delta based on the initial state and the current state. In an embodiment, the delta may be changes made to the initial state. For example, if data source 121 includes multiple variables and only one of the variables changed, data orchestration system 120 may determine a delta that includes only this change. In this fashion, the size of and computational requirements for a transmission may be reduced. In alternate embodiment, data orchestration system 120 may re-calculate or re-derive the state in its entirety and transmit the entire state again to the front-ends currently viewing the scene.

In 312, data orchestration system 120 may send the delta determined in 310 to one or more clients, such as client 130. Connection manager 124 may send any updated states to the list of connected clients, as stored and managed by connection manager 124. In an embodiment, a transmission may occur via an open websocket connection. Client 130 may then apply the state change to the local scene to allow the user to see the change in real-time. The end result finds connected clients, i.e. client 130, receiving an update that occurred in data repository 110, subject to transformational modifications performed within data orchestration system 120. This allow users to collaborate, communicate, and view identical data when interfacing with data orchestration system 120.

Figure 4:
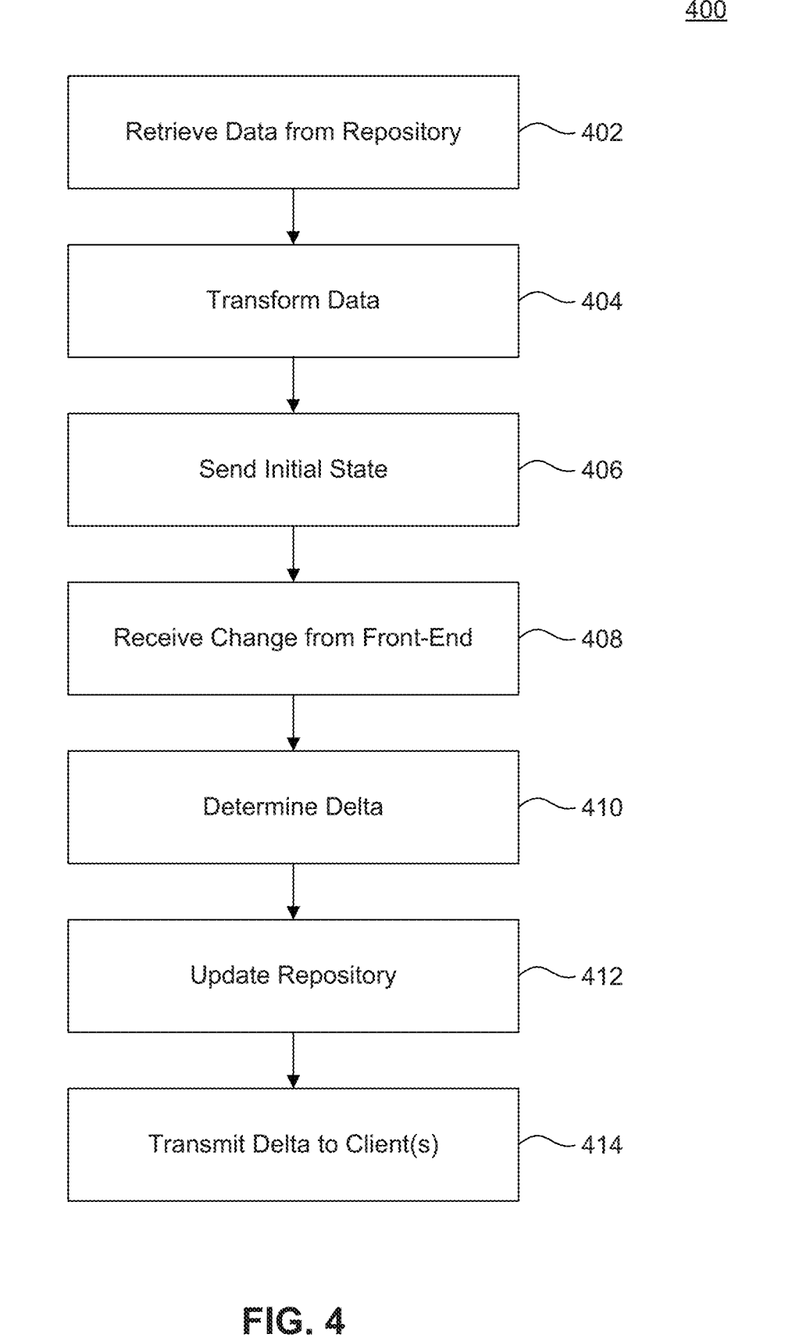
FIG. 4 is a flowchart illustrating a method of receiving a change to a displayed scene from a client and propagating the change to a backend repository and one or more clients, according to some embodiments.

FIG. 4 illustrates a method 400 of receiving a change to a displayed scene from a client and propagating the change to a backend repository and other clients, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, data orchestration system 120 may retrieve information from data repository 110. In an alternate embodiment, data orchestration system 120 may retrieve data from an internal storage mechanism. Data orchestration system 120 may retrieve the information using an appropriate simple, stateless communication pipeline, e.g. a channel (e.g. channels 123), an open database connectivity interface, or other suitable retrieval technique. In one embodiment, data orchestration system 120 may formulate an appropriate structured-querying-language query or other formal- or natural-language construct to pull the relevant subset of data based upon permissions or other factors. Data orchestration system 120 may store the data or a portion of the data in memory, a local hard disk, a data structure, or any other suitable storage mechanism facilitating manipulation and transformation during subsequent steps. In some embodiments, data orchestration system 120 may retrieve the data through a suitable driver, application programming interface, querying mechanism, and/or other suitable protocol, for example, OData.

In 404, data orchestration system 120 may modify data retrieved in 402 in a myriad of programmatic and transformative fashions. Data orchestration system 120 may employ channels 123 to pass the data between and among operators 126, data sources (e.g. data source 121), scenes (e.g., scene 210), and other components. Data orchestration system 120 may store transformed data as data source 121 or as intermediary or transitional data state. For example, data orchestration system 120 may convert data from one format to another, present a visualization of the data, perform calculations and analytics based on the data, analyze video files using artificial intelligence, and perform many other functions. Data orchestration system 120 may transform data according to requirements specified by a scene, such as described above as scene 210.

In 406, data orchestration system 120 may send an initial state to client 130. One or more clients, such as client 130, may receive an initial state based on the information stored in data orchestration system 120. The number of connections between data orchestration system 120 and clients may vary based on the time and circumstances. Connection manager 124 may determine and track the connecting front-ends, i.e., client 130, that are to receive the initial state. Data orchestration system 120 may determine the initial state data orchestration system 120 performs the transformational steps in 404. In an embodiment, the initial state may be stored, written, and/or relayed in JSON, XML, or other appropriate human and/or machine readable transfer protocol. In an alternate embodiment, the initial state may be reflected by any suitable Javascript variable and any suitable type, for example, Booleans, numbers, strings, arrays, structures, and advanced object types such as images, audio files, and videos. Connection manager 124 may send the initial state to other connected clients, such as client 130, as stored and managed by connection manager 124. In an embodiment, the initial state may be transfer to client 130 using an open websocket connection. Data orchestration system 120 may transfer the initial state to data repository 110 via channels 123 or other stateless or restful protocol.

In 408, data orchestration system 120 may receive a change from a front-end, such as client 130. For example, in some scenes filtering mechanisms may be provided, e.g., an amplitude slider that changes the resolution of a data-powered graph being viewed. A user of client 130, may change the amplitude of a graph to get more detail about the graph, i.e., by sliding the input mechanism to display a higher amplitude, wider range, etc. In other examples, client 130 may update the underlying data, for instance by adding a record or updating information in the data.

In 410, data orchestration system 120 may determine a delta based on the initial state and the change received from client 130. In an embodiment, the delta may be changes to the initial state made by a user while interacting with a scene. For example, if data source 121 includes multiple variables and only one of the variables changed, data orchestration system 120 may determine a delta that includes only this change. In this fashion, the size of and computational requirements for a transmission may be reduced. In alternate embodiment, data orchestration system 120 may re-calculate or re-derive the state in its entirety and transmit the entire state again to the front-ends currently viewing the scene.

In 412, data orchestration system 120 may communicate the change to the backend systems, e.g., data repository 110. In an embodiment, data orchestration system 120 may formulate appropriate structured queries to update data repository 110. Data orchestration system 120 may communicate with data repository 110 via a pipeline, channels 123, or other suitable connection protocol.

In 414, data orchestration system 120 may send the delta determined in 410 to one or more clients, such as client 130, concurrently connected to data orchestration system 120. Connection manager 124 may send updated states to the list of connected clients, as stored and managed by connection manager 124. In an embodiment, a transmission may occur via an open websocket connection. Client 130 may then apply the state change to the local scene to allow the user to see the change in real-time. The end result finds connected clients receiving an update that occurred on one client 130, allowing users to collaborate when interfacing with data orchestration system 120.

Figure 5:
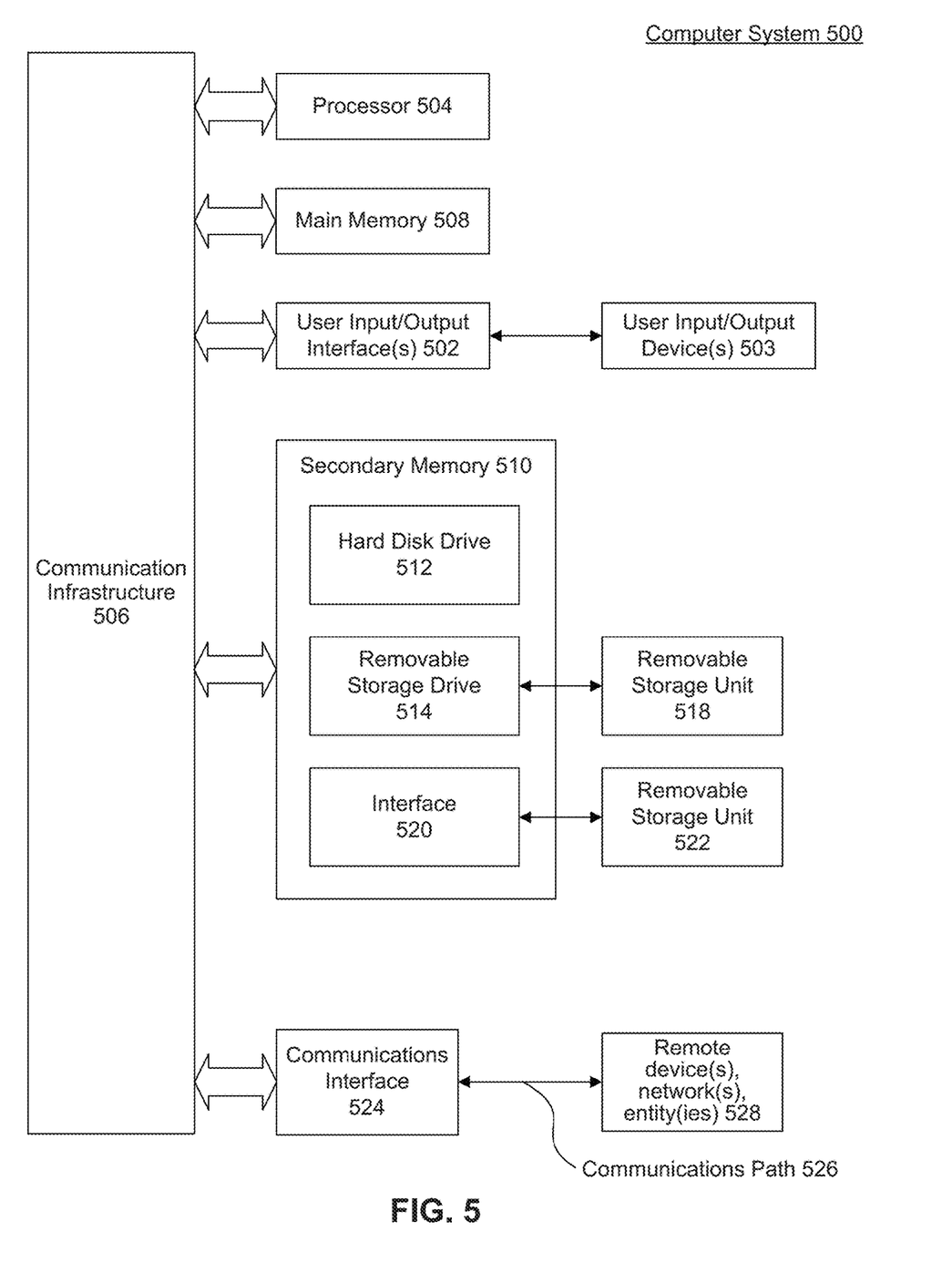
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518.

Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, a standalone Virtual Reality device, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operators, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
retrieving, by one or more processors, a data source comprising a state from a data repository via a channel;
establishing, by the one or more processors, one or more connections with one or more front-ends via a communication protocol;
displaying, by the one or more processors, the state to the one or more front-ends in a scene via the one or more connections, wherein the scene is a user interface designed in a data orchestration system through which the one or more front-ends may view the data source;
displaying, by the one or more processors, a map view of a data hub comprising:
one or more visual nodes representing a data processing pipeline, wherein the data processing pipeline represents possible data sources, data repositories, or operators comprising functions configured to transform and analyze data in the data orchestration system;
one or more visual nodes representing the scene comprising an interface through which the one or more front-ends may view the scene;
one or more connections between the one or more visual nodes representing the data processing pipeline and the one or more visual nodes representing the scene;
a configuration tool configured to create and modify the map view of the data hub comprising:
a visualization tool configured to display the map view of the data hub in graphical form, wherein the one or more visual nodes representing the data processing pipeline and the one or more visual nodes representing the scene are dragged and dropped on the user interface to build a map view of the data hub; and
a configuration panel configured to adjust the properties of the one or more visual nodes in the data hub;

receiving, by the one or more processors, a change to the state;

creating, by the one or more processors, an updated state based on the change and the state; and propagating, by the one or more processors, the updated state to the one or more front-ends to redisplay the scene via the one or more connections, wherein the one or more front-ends are remote to the data orchestration system.

2. The method of claim 1, further comprising:

transforming, by the one or more processors, data from the data repository into the data source based on a configured data pipeline.

3. The method of claim 1, the propagating further comprising:

sending, by the one or more processors, an initial state to the one or more front-ends;

determining, by the one or more processors, a delta based on the change and the initial state; and sending, by the one or more processors, the delta as the updated state to the one or more front-ends to redisplay the scene.

4. The method of claim 1, further comprising:

receiving, by the one or more processors, a request from a new front-end to view the scene;

adding, by the one or more processors, the new front-end to the one or more front-ends; and sending, by the one or more processors, the state to the new front-end.

5. The method of claim 1, the receiving further comprising:

receiving, by the one or more processors, the change from a front-end in the one or more front-ends viewing the scene via the communication protocol.

6. The method of claim 1, the receiving further comprising:

receiving, by the one or more processors, the change from the data repository via a stateless communication pipeline.

7. The method of claim 1, wherein the communication protocol is a websocket connection.

8. A system, comprising:

a memory; and at least one processor coupled to the memory and configured to:

retrieve a data source comprising a state from a data repository via a channel in a data orchestration system;

establish one or more connections with one or more front-ends via a communication protocol;

display the state to the one or more front-ends in a scene via the one or more connections, wherein the scene is a user interface designed in a data orchestration system through which the one or more front-ends may view the data source a communication protocol;

display a map view of a data hub comprising:

one or more visual nodes representing a data processing pipeline, wherein the data processing pipeline represents possible data sources, data repositories, or operators comprising functions configured to transform and analyze data in the data orchestration system;

one or more visual nodes representing the scene comprising an interface through which the one or more front-ends may view the scene;

one or more connections between the one or more visual nodes representing the data processing pipeline and the one or more visual nodes representing the scene;

a configuration tool configured to create and modify the map view of the data hub comprising:

a visualization tool configured to display the map view of the data hub in graphical form, wherein the one or more visual nodes representing the data processing pipeline and the one or more visual nodes representing the scene are dragged and dropped on the user interface to build a map view of the data hub; and a configuration panel configured to adjust the properties of the one or more visual nodes in the data hub;

receive a change to the state;

create an updated state based on the change and the state; and propagate the updated state to the one or more front-ends to redisplay the scene via the one or more connections, wherein the one or more front-ends are remote to the data orchestration system.

9. The system of claim 8, the at least one processor further configured to:

transform data from the data repository into the data source based on a configured data pipeline.

10. The system of claim 8, wherein to propagate the updated state, the at least one processor is configured to:

send an initial state to the one or more front-ends;

determine a delta based on the change and the initial state; and send the delta as the updated state to the one or more front-ends to redisplay the scene.

11. The system of claim 8, the at least one processor further configured to:

receive a request from a new front-end to view the scene;

add the new front-end to the one or more front-ends; and send the state to the new front-end.

12. The system of claim 8, wherein to receive the change, the at least one processor is configured to:

receive the change from a front-end in the one or more front-ends viewing the scene via the communication protocol.

13. The system of claim 8, wherein to receive the change, the at least one processor is configured to:

receive the change from the data repository via a stateless communication pipeline.

14. The system of claim 8, wherein the communication protocol is a websocket connection.

15. A non-transitory computer-readable device having instructions stored thereon that, when executed by at least one computing device, cause the at least one computing device to perform operations comprising:

retrieving a data source comprising a state from a data repository via a channel in a data orchestration system;

establishing one or more connections with one or more front-ends via a communication protocol;

displaying the state to one or more front-ends in a scene via the one or more connections, wherein the scene is a user interface designed in a data orchestration system through which the one or more front-ends may view the data source;

displaying a map view of a data hub comprising:

one or more visual nodes representing a data processing pipeline, wherein the data processing pipeline represents possible data sources, data repositories, or operators comprising functions configured to transform and analyze data in the data orchestration system;

one or more visual nodes representing the scene comprising an interface through which the one or more front-ends may view the scene;

one or more connections between the one or more visual nodes representing the data processing pipeline and the one or more visual nodes representing the scene;
a configuration tool configured to create and modify the map view of the data hub comprising:
a visualization tool configured to display the map view of the data hub in graphical form, wherein the one or more visual nodes representing the data processing pipeline and the one or more visual nodes representing the scene are dragged and dropped on the user interface to build a map view of the data hub; and
a configuration panel configured to adjust the properties of the one or more visual nodes in the data hub;
receiving a change to the state;
creating an updated state based on the change and the state; and
propagating the updated state to the one or more front-ends to redisplay the scene via the one or more connections, wherein the one or more front-ends are remote to the data orchestration system.

16. The non-transitory computer-readable device of claim 15, further comprising:
transforming data from the data repository into the data source based on a configured data pipeline.

17. The non-transitory computer-readable device of claim 15, the propagating further comprising:
sending an initial state to the one or more front-ends;
determining a delta based on the change and the initial state; and
sending the delta as the updated state to the one or more front-ends to redisplay the scene.

18. The non-transitory computer-readable device of claim 15, the operations further comprising:
receiving a request from a new front-end to view the scene;
adding the new front-end to the one or more front-ends; and
sending the state to the new front-end.

19. The non-transitory computer-readable device of claim 15, the receiving the change further comprising:
receiving the change from a front-end in the one or more front-ends viewing the scene via the communication protocol.

20. The non-transitory computer-readable device of claim 15, the receiving further comprising:
receiving the change from the data repository via a stateless communication pipeline.

* * * * *